Patented Apr. 7, 1925.

1,532,398

UNITED STATES PATENT OFFICE.

WILLIAM C. GEER AND WEBSTER N. JONES, OF AKRON, OHIO, ASSIGNORS TO B. F. GOODRICH COMPANY, OF NEW YORK, N. Y., A CORPORATION OF NEW YORK.

RUBBER COMPOSITION AND METHOD OF PRESERVING RUBBER.

No Drawing. Application filed October 12, 1922. Serial No. 594,171.

*To all whom it may concern:*

Be it known that we, WILLIAM C. GEER and WEBSTER N. JONES, citizens of the United States, residing at Akron, in the county of Summit and State of Ohio, have invented a certain new and useful Rubber Composition and Method of Preserving Rubber, of which the following is a specification.

This invention relates to the art of preserving vulcanized rubber, and goods made thereof, from deterioration such as results from the aging of the rubber, such deterioration commonly being attributed largely to oxidation of the rubber or rubber compound.

Our object is to provide an improved method of preserving vulcanized rubber, and to provide a rubber compound having good inherent age-resisting qualities and other desirable properties.

Our invention, briefly stated, comprises treating the rubber, before or after vulcanization, with 1,8-naphthylene diamine. By way of example, this substance may be milled into the uncured compound, preferably from 1 to 10 parts by weight of 1,8-naphthylene diamine to 1000 parts of rubber, and the rubber then vulcanized as in the usual practice in the manufacture of rubber goods. The presence of the preservative in the resulting vulcanized rubber imparts excellent age resisting properties thereto.

The preservative may also be applied to the rubber with good effect, either before or after vulcanization, by other procedure than by milling, as by applying it in solution, in a suitable solvent such as benzene or water, to the surface of the rubber, or in the form of a finely divided paste or emulsion, or by vapor treatment.

The term "treating" as employed in the appended claims is to be understood as generic either to the incorporation of the preservative in rubber or to the application of the preservative to the surface of a mass of rubber.

As usually prepared, the 1,8-naphthylene diamine is frequently more or less contaminated, usually containing 1,5-naphthylene diamine, but we find that the presence of the latter does not destroy the effectiveness of the 1,8-naphthylene diamine as a preservative of the rubber.

We claim:

1. The method of preserving rubber which comprises treating the rubber with 1,8-naphthylene diamine.

2. The method of preserving vulcanized rubber which comprises incorporating 1,8-naphthylene diamine in the rubber before vulcanization in the proportion of 1 or more parts by weight of 1,8-naphthylene diamine to 1,000 parts of rubber.

3. The method of preserving rubber which comprises incorporating therein 1,8-naphthylene diamine in the proportion of 1 or more parts by weight of 1,8-naphthylene diamine to 1,000 parts by weight of rubber.

4. A composition of matter containing rubber and 1,8-naphthylene diamine in the proportion of 1 or more parts by weight of 1,8-naphthylene diamine to 1,000 parts of rubber.

5. A composition of matter comprising vulcanized rubber containing before vulcanization 1,8-naphthylene diamine in the proportion of 1 or more parts of 1,8-naphthylene diamine to 1,000 parts of rubber.

6. The herein described product comprising rubber and 1,8-naphthylene diamine.

7. The herein described product comprising rubber which has been treated with 1,8-naphthylene diamine.

In witness whereof we have hereunto set our hands this 6 day of October, 1922.

WILLIAM C. GEER.
WEBSTER N. JONES.